(12) United States Patent
Levin et al.

(10) Patent No.: US 7,984,035 B2
(45) Date of Patent: Jul. 19, 2011

(54) CONTEXT-BASED DOCUMENT SEARCH

(75) Inventors: Lewis Charles Levin, Seattle, WA (US); Christopher Hugh Pratley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 417 days.

(21) Appl. No.: 11/966,963

(22) Filed: Dec. 28, 2007

(65) Prior Publication Data

US 2009/0171938 A1 Jul. 2, 2009

(51) Int. Cl.
*G06F 17/30* (2006.01)

(52) U.S. Cl. ........ 707/706; 707/708; 707/715; 707/723; 707/728; 707/729

(58) Field of Classification Search .................. 707/706, 707/708, 723, 711–715, 728–729
See application file for complete search history.

(56) References Cited

U.S. PATENT DOCUMENTS

| | | | |
|---|---|---|---|
| 6,189,002 B1 | 2/2001 | Roitblat | |
| 6,701,311 B2 | 3/2004 | Biebesheimer et al. | |
| 6,859,800 B1 * | 2/2005 | Roche et al. | 707/718 |
| 7,117,208 B2 | 10/2006 | Tamayo et al. | |
| 7,216,121 B2 | 5/2007 | Bachman et al. | |
| 7,305,380 B1 * | 12/2007 | Hoelzle et al. | 1/1 |
| 7,421,441 B1 * | 9/2008 | Chan et al. | 1/1 |
| 7,610,282 B1 * | 10/2009 | Datar et al. | 1/1 |
| 7,644,072 B2 * | 1/2010 | Budzik et al. | 700/29 |
| 2002/0123994 A1 * | 9/2002 | Schabes et al. | 707/5 |
| 2002/0184211 A1 * | 12/2002 | Gruenwald | 707/6 |
| 2004/0093328 A1 * | 5/2004 | Damle | 707/3 |
| 2005/0002562 A1 * | 1/2005 | Nakajima et al. | 382/159 |
| 2005/0075881 A1 * | 4/2005 | Rigazio et al. | 704/270 |
| 2005/0149496 A1 * | 7/2005 | Mukherjee et al. | 707/3 |
| 2005/0160082 A1 | 7/2005 | Dawson | |
| 2005/0228792 A1 * | 10/2005 | Chandrasekaran et al. | 707/9 |
| 2005/0240352 A1 | 10/2005 | Liang | |
| 2006/0026013 A1 * | 2/2006 | Kraft | 705/1 |
| 2006/0047635 A1 | 3/2006 | Kraenzel et al. | |
| 2006/0080300 A1 * | 4/2006 | Gruenwald | 707/3 |
| 2006/0136391 A1 | 6/2006 | Morris | |
| 2006/0167857 A1 * | 7/2006 | Kraft et al. | 707/3 |
| 2006/0184516 A1 | 8/2006 | Ellis | |

(Continued)

FOREIGN PATENT DOCUMENTS

JP 2002197113 A 7/2002

OTHER PUBLICATIONS

Susan Dumais, et al. Optimizing Search by Showing Results in Context. SIGCHI'01, Mar. 31-Apr. 4, 2001, Seattle, WA, USA. ACM 1-58113-327-8/01/0003. http://research.microsoft.com/~sdumais/chi2001.pdf. Last accessed Aug. 10, 2007, 8 pages.

(Continued)

*Primary Examiner* — Hanh B Thai
(74) *Attorney, Agent, or Firm* — Lee & Hayes, PLLC

(57) ABSTRACT

Systems and corresponding methodologies are disclosed that employ 'context' of a document upon searching for relevant or desired references/results. The innovation establishes 'context' of a document thereby increasing relevance upon returning results to search queries. Context-based searching establishes relationships between terms of a document in order to focus more upon an interpretation of a document rather than merely considering a topic of a document based upon word occurrences, as used by traditional searching mechanisms.

20 Claims, 10 Drawing Sheets

U.S. PATENT DOCUMENTS

| | | | |
|---|---|---|---|
| 2006/0200461 A1* | 9/2006 | Lucas et al. | 707/5 |
| 2006/0230040 A1 | 10/2006 | Curtis et al. | |
| 2006/0235843 A1 | 10/2006 | Musgrove et al. | |
| 2006/0282465 A1* | 12/2006 | Sharma | 707/104.1 |
| 2007/0061294 A1 | 3/2007 | Parnell et al. | |
| 2007/0159522 A1* | 7/2007 | Neven | 348/14.02 |
| 2007/0174255 A1 | 7/2007 | Sravanapudi et al. | |
| 2007/0198506 A1* | 8/2007 | Attaran Rezaei et al. | 707/5 |
| 2007/0233671 A1* | 10/2007 | Oztekin et al. | 707/5 |
| 2008/0016109 A1* | 1/2008 | Henkin et al. | 707/102 |
| 2008/0091650 A1* | 4/2008 | Fontoura et al. | 707/3 |
| 2008/0097985 A1* | 4/2008 | Olstad et al. | 707/5 |
| 2008/0120276 A1* | 5/2008 | Chennavasin | 707/3 |
| 2008/0154873 A1* | 6/2008 | Redlich et al. | 707/5 |
| 2008/0244428 A1* | 10/2008 | Fain | 715/764 |
| 2008/0263032 A1* | 10/2008 | Vailaya et al. | 707/6 |
| 2008/0270380 A1* | 10/2008 | Ohrn et al. | 707/5 |

OTHER PUBLICATIONS

Zhicheng Dou, et al. A Largescale Evaluation and Analysis of Personalized Search Strategies, WWW 2007, May 8-12, 2007, Banff, Alberta, Canada. ACM 9781595936547/ 07/0005. http://delivery.acm.org/10.1145/1250000/1242651/p581-dou.pdf?key1=1242651&key2=3513276811&coll=GUIDE&dl=GUIDE&CFID=31312117&CFTOKEN=28670563. Last accessed Aug. 10, 2007, 10 pages.

Fang Liu, et al. Personalized Web Search by Mapping User Queries to Categories. CIKM'02, Nov. 4-9, 2002, McLean, Virginia, USA. ACM 1-58113-492-4/02/0011 http://delivery.acm.org/10.1145/590000/584884/p558-liu.pdf?key1=584884&key2=7733276811&coll=GUIDE&dl=GUIDE&CFID=31312367&CFTOKEN=54030487. Last accessed Aug. 9, 2007, 8 pages.

PCT International Search Report and Written Opinion for PCT Application No PCT/US2008/087880 mailed Apr. 29, 2009, 11 pgs.

* cited by examiner

CONTEXT-BASED DOCUMENT SEARCH

BACKGROUND

Technological advances in computer hardware, software and networking have lead to increased demand for electronic information exchange rather than through conventional techniques such as paper and telephone correspondence, for example. Such electronic communication can provide split-second, reliable data transfer between essentially any two locations throughout the world. Many enterprises and consumers are leveraging such technology to improve efficiency and decrease costs associated with traditional office environment. In other words, many offices are transitioning to a 'paperless' office structure rather than storing an overabundance of hardcopy paper files and documents.

As the amount of available electronic data grows, it becomes more important to store and/or utilize such data in a manageable manner that facilitates user-friendly and quick data searches and retrieval. For example, office productivity tools (e.g., word processing, spread sheets, presentation applications, electronic mail (email) applications, personal information manager (PIM) applications, etc.) can easily rise to a level of storage in the range of megabytes, gigabytes or even more.

The use of physical paper to store hardcopies of information has been noted to contribute to a declination of the environment as large amounts of trees are lumbered for paper creation. In addition to its ill affects on the environment, physical paper can be costly, unorganized, inefficient, and space-consuming. As many users and enterprises become more and more 'paperless,' organization of data becomes increasingly important. As well, locating a desired document within a vast storage device can also be difficult using traditional search mechanisms.

Conventional computer-based search, in general, is extremely text-centric in that search engines typically analyze content of alphanumeric search queries in order to return results. These traditional search engines merely parse an alphanumeric queries into 'keywords' and subsequently perform searches based upon a defined number of instances of each of the keywords in a reference.

In the Internet world, search engine agents, often referred to as spiders or crawlers, navigate websites in a methodical manner and retrieve information from available websites. For example, a crawler can make a copy of all or a portion of websites and related information. The search engine then analyzes the content captured by one or more crawlers to determine criterion by which to index a particular site. Some engines will index all words on a website while others may only index terms associated with particular tags such as such for example: title, header or metatag(s).

Nonetheless, conventional search engines merely consider literal 'content,' for example keyword occurrences, when indexing or locating results to a search query. In other words, conventional search engines do not perform any sophisticated analysis or interpretation but, rather merely use keywords, phrases, titles, headers, etc. to index a document.

Once indexes are generated, they typically are assigned a ranking with respect to occurrences of certain keywords, and stored in a database. An algorithm is often employed to evaluate the index for relevancy based upon the keyword 'hit rate,' for example, based upon frequency of words on a webpage, among other things. A distinctive factor in performance amongst conventional search engines is the ranking algorithm respectively employed.

Upon entry of one or more keywords into a search query, traditional search engines most often retrieve indexed information that matches the query from the database, generates a snippet of text associated with each of the matching sites and displays the results to a user. The user can thereafter scroll through a plurality of returned sites in connection with determining if the sites are related to interests of the user. However, this can be an extremely time-consuming and frustrating process as search engines often return a substantial number of sites. More often than not, the user is forced to further narrow the search iteratively by altering and/or adding keywords and operators to converge on websites that provide the sought after information.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that employs 'context' upon searching for relevant or desired references/results. In other words, rather than merely considering 'content' when searching for relevant information, the innovation can establish 'context' of a document thereby increasing relevance upon returning results to search queries. As used herein, a 'document' refers to most any document (independent of format) related to an office environment or network including, but not limited to, an email (with or without attachments), a word processor document, a presentation document, an image document, a facsimile, a spreadsheet, an audio document, a video document, portable document format (e.g., PDF) data, a web page, etc.

Context-based searching in accordance with aspects of the innovation establishes relationships between terms of a document in order to focus more upon an interpretation of a document rather than merely considering a topic of a document based upon word occurrences, as used by traditional searching mechanisms. Thus, use of all terms within a document can be considered when performing a search to incorporate context into the search thereby enhancing relevance and quality of results returned.

In yet another aspect thereof, a machine learning and reasoning component is provided that employs a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
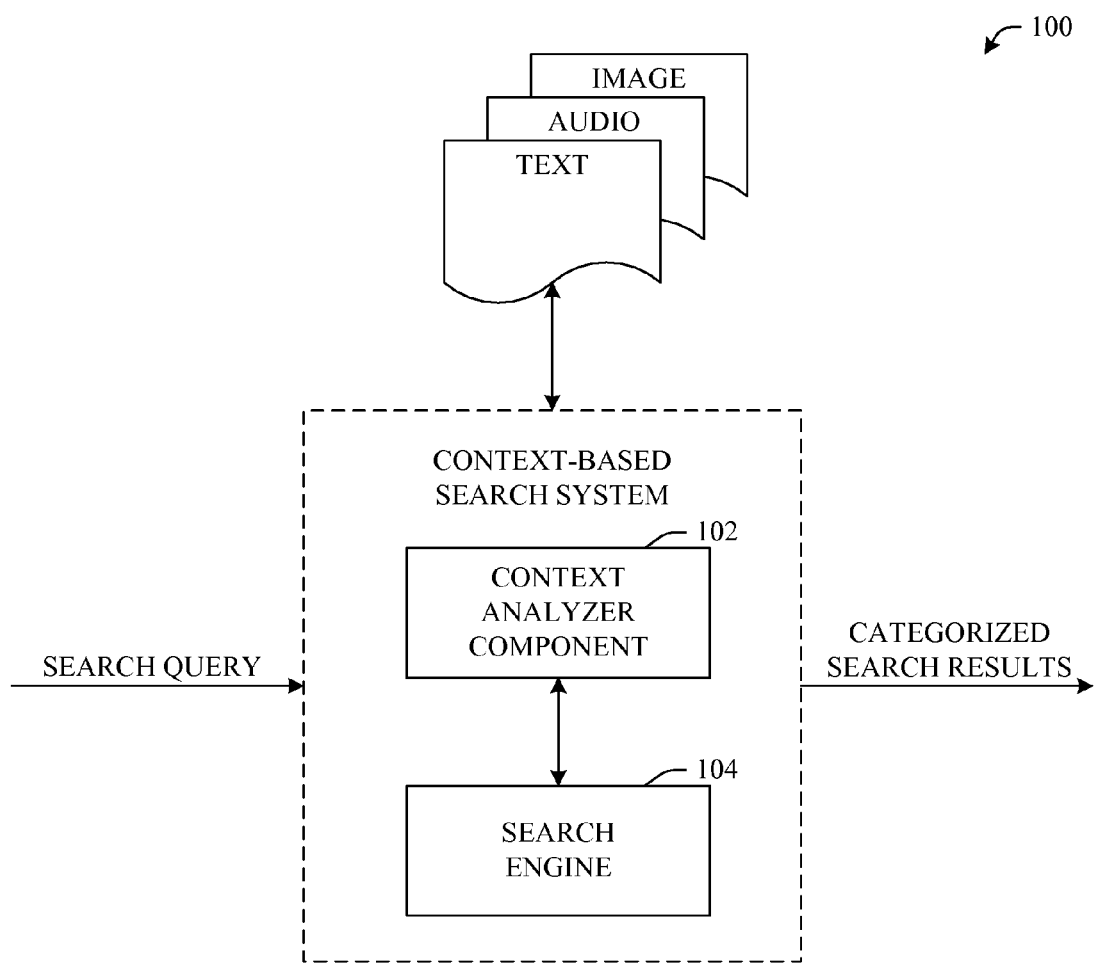
FIG. 1 illustrates an example system that facilitates context-based document search in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that enables documents to be searched based upon context. Additionally, system 100 enables contextually-based categorized search results to be rendered, e.g., displayed or presented to a user or application. As illustrated, 'documents' as used herein can refer to most any document type including, but not limited to text, audio, image or the like. While three specific document types are illustrated, it is to be understood that the features, functions and benefits of the innovation can be applied to most any document type without departing from the spirit and/or scope of the innovation. In other words, 'document' refers to most any data (independent of format) related to an office environment or network including, but not limited to, an email (with or without attachments), a word processor document, a presentation document, an image document, a facsimile, a spreadsheet, an audio document, a video document, portable document format (e.g., PDF) data, a web page, etc. The context-based search functionality can be applied to most any data type or element without departing from the spirit and scope of this specification and claims appended hereto.

Generally, the context-based search system 100 of FIG. 1 can include a context analyzer component 102 and a search engine 104. Together, these components (102, 104) can be employed to identify contextual factors related to documents and thereafter to identify a subset of the documents based upon relevance in view of a search query. In other words, a context (or multiple contexts) can be established for each of the documents. This context can be mapped to keywords (or other search criteria such as pattern or pixel format) within a search query thereby enhancing relevance of search results.

As will be described in detail throughout this specification, context-based searching refers to employing contextual factors within computer-based searches. In other words, for example, upon searching for a document, a conventional content-based searching mechanism would merely locate a requested term such as 'Gretzky.' The context analyzer 102 together with the search engine 104 of the innovation employs context to determine that 'Gretzky' may also be associated to the city 'Los Angeles,' 'hockey,' etc. Thus, documents that do not specifically include the term 'Gretzky' can be returned by associating the context of the other documents. The innovation can use all terms in a document when performing search to add context to present search query, e.g., by noticing patterns during the search and across data structures to allow context additions, looking at the locale of every other word that appears in the same document to see if the terms may be employed as context enhancers for present search, etc. In this example, 'locale' or 'locality' can refer to some arbitrary boundary within a document, where a defined or inferred model helps define what is within the locale of what one is searching.

In another aspect, the system 100 can troll documents (e.g., in a local or remote store) or the Internet for what should be read based upon a user profile and/or determined context. In other words, the system 100 can be employed to enhance a user's searching capability by improving quality and relevance of search results. As will be described with reference to the figures that follow, the system 100 can establish a context-based index as documents are created, modified and/or deleted (or subsequently as desired). As will be understood, this index can enhance searching capabilities of the system 100.

In other aspects, metadata (e.g., tags) can be incorporated into a document to enhance searchability. In other words, like the aforementioned index, the context-based metadata can greatly reduce process and analysis time to identify context of each document upon execution of a search query. In this example, these contextual tags can be embedded within a title or header of a document thus, upon a search, only the title or header will have to be scanned in order to determine contextual relevance based upon the search query. These and other aspects will be described in greater detail infra with reference to the figures that follow.

Figure 2:
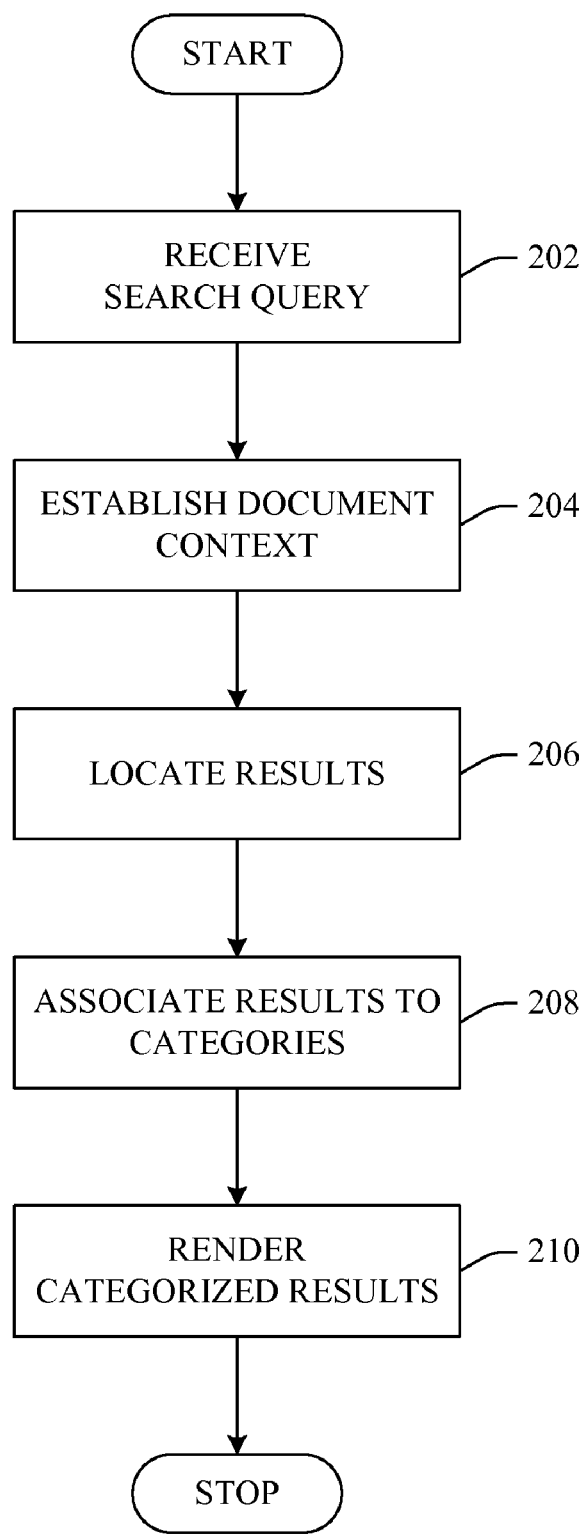
FIG. 2 illustrates an example flow chart of procedures that facilitate categorizing search results based upon context in accordance with an aspect of the innovation.

FIG. 2 illustrates a methodology of employing document context in computer-based searches in accordance with an aspect of the innovation. Essentially, the methodology of FIG. 2 enhances document searchability by incorporating context into the process of searching for documents. In other words, rather than merely word-searching the content of a document to determine search results, the innovation enables sophisticated logic to establish context of references or documents. This context can be used to enhance computer-based searches thereby increasing relevance of search results.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, a search query can be received, for example, a user can craft a query of keywords. Still further, a user search query can be parsed in order to define (or infer) keywords within the query. By way of example, a user can craft a query such as 'What teams did Wayne Gretzky play for in his career?' While conventional searches would merely look for documents that contain keywords such as 'teams,' 'Wayne,' 'Gretzky,' and 'career,' the subject innovation can further employ these terms to establish search results based upon context rather than merely content.

At 204, context of a document can be established. Here, a document can be analyzed in order to establish context (e.g., meaning, subject, topic, perspective, background) of a particular document or reference. For instance, a document that mentions 'Gretzky' in a discussion of 'gambling' or 'betting' may not necessarily be a relevant search result to the example search query above (e.g., team identification). Rather, this document's context may be determined or inferred to be associated with gambling within professional hockey or more broadly as illegal activity within professional sports.

Figure 3:
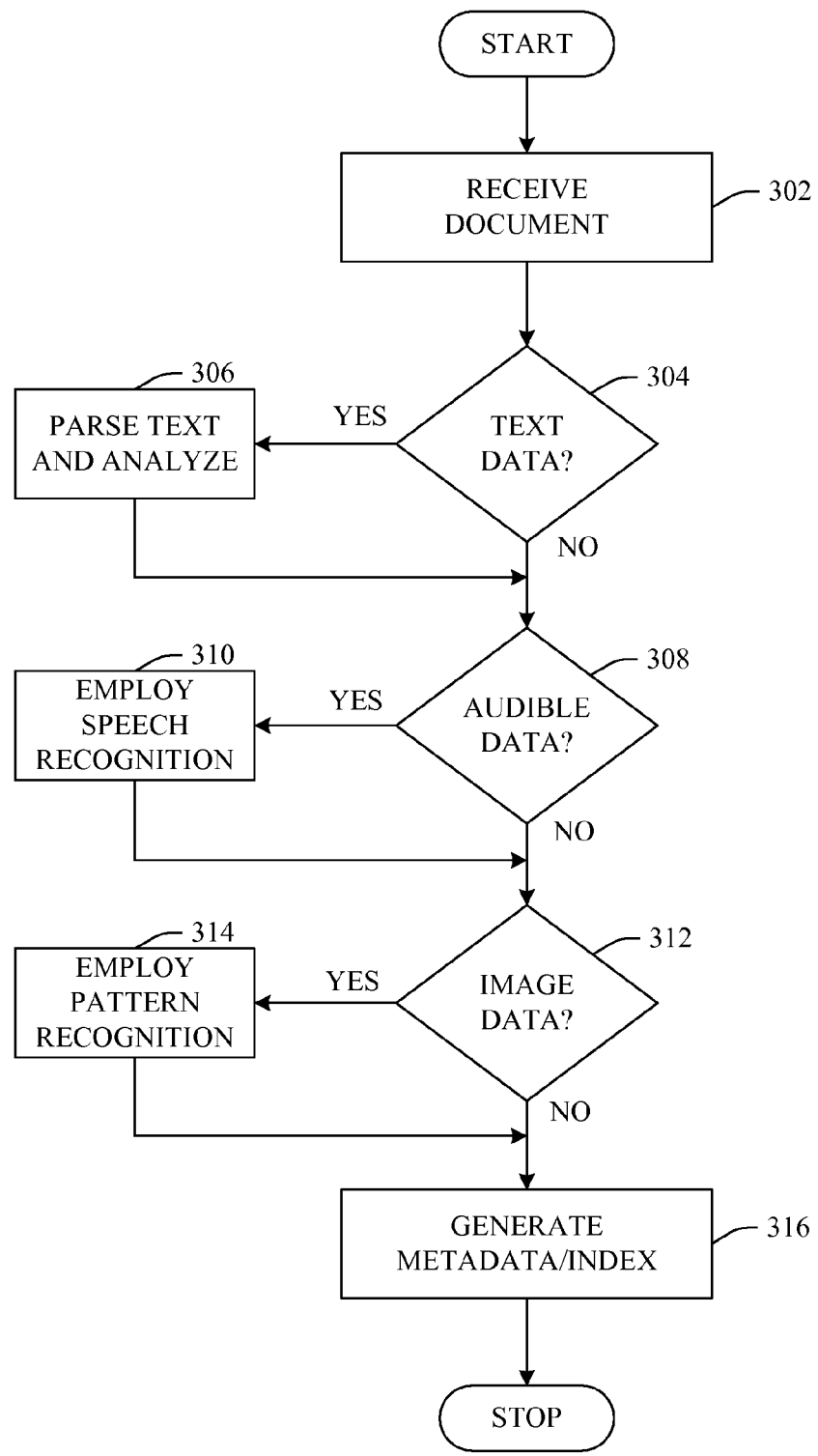
FIG. 3 illustrates an example flow chart of procedures that facilitate establishment of a context-based index in accordance with an aspect of the innovation.

As described supra, in addition to 'on-the-fly' contextual determination, aspects can employ metadata and/or indexes to enhance performance of contextual-based searches. An example of these embodiments is illustrated in FIG. 3 as described below. While the methodology of FIG. 3 describes the use of metadata and/or indexes to enhance contextual-based search, it is to be understood that the context-based searching functionality can be established 'on-the-fly' (e.g., in real-time) in accordance with other aspects. All of these aspects are to be included within the scope of the innovation and claims appended hereto.

With reference again to FIG. 2, results can be located at 206. Here, contextually relevant documents are located in view of the search query. Essentially, at 206, context of a document is employed to establish relevance rather than solely keyword occurrence as employed by conventional systems.

At 208, the results can be aggregated and categorized as desired or appropriate. In other words, in one aspect, categories can be established that correspond to different contexts. Accordingly, the results can be mapped into a particular category (or group of categories) and rendered at 210.

Referring again to the aforementioned 'Gretzky' search example, categories may be 'hockey players,' 'Edmonton Oilers,' 'Los Angeles Kings,' 'St. Louis Blues,' 'New York Rangers,' 'NHL,' etc. In other words, context of a document can be used to classify, sort or group documents into categories. Thus, relevance of a reference can be conveyed based upon a category designation as well as a rank within a particular category. Additionally, it is to be appreciated that most any structure of categories (e.g., sub-categories) can be employed in alternative embodiments.

Still further, references within a document can be used to further enhance a search query, thereby enhancing comprehensiveness of a search. For instance, terms within a document that has a determined context to be about the life of Wayne Gretzky can be used to locate additional references. For example, although the original search query in this example used the term 'career,' another reference may associate 'lifetime,' 'tenure,' etc. such that references that employ these terms within a desired context can also be returned as relevant results.

Referring now to FIG. 3, there is illustrated a methodology of establishing context of a document in accordance with the innovation. At 302, a document is received, for example, upon original authorship/creation, modification, etc. Additionally, the document can be received (or accessed) by way of a crawler or other tool designed to automatically analyze and/or index documents.

At 304, a determination is made to conclude if the document includes text data. If so, at 306, the data can be parsed and analyzed to determine keywords and subsequently context of the text. Similarly, at 308, a determination can be made to conclude if the document includes audible data. If the document does include audible data, at 310, speech recognition (or other suitable sound analysis) mechanisms can be used to establish keywords associated with the audible data and subsequently the context of the keywords in view of the translated document. By way of example, if the audible data is a song, the speech recognition can be used to translate audible speech into text lyrics with respect to the song. Subsequently, the context of the document can be established.

Still further, at 312, a determination is made if the document contains visible data (e.g., image data). As with text and sound described above, if visible data is present, key features (e.g., attributes and/or characteristics) can be established via pattern recognition mechanisms at 314. In one particular aspect, facial recognition mechanisms can be employed to determine an identity of an individual in the image. Further, pattern recognition can be employed to determine other characteristics or objects included within the image such as, for example, places, buildings, landmarks, colors, venues, etc. Thus, context of the document can be established.

Once the document is analyzed (e.g., 304-314), at 316, metadata and/or an index can be established to enhance searchability. In other examples, the context can be established and employed, 'on-the-fly' or in real-time, to enhance relevance of search results. Moreover, this context can be employed to further enhance the search query thereby increasing comprehensiveness of a computer-based search.

Figure 4:
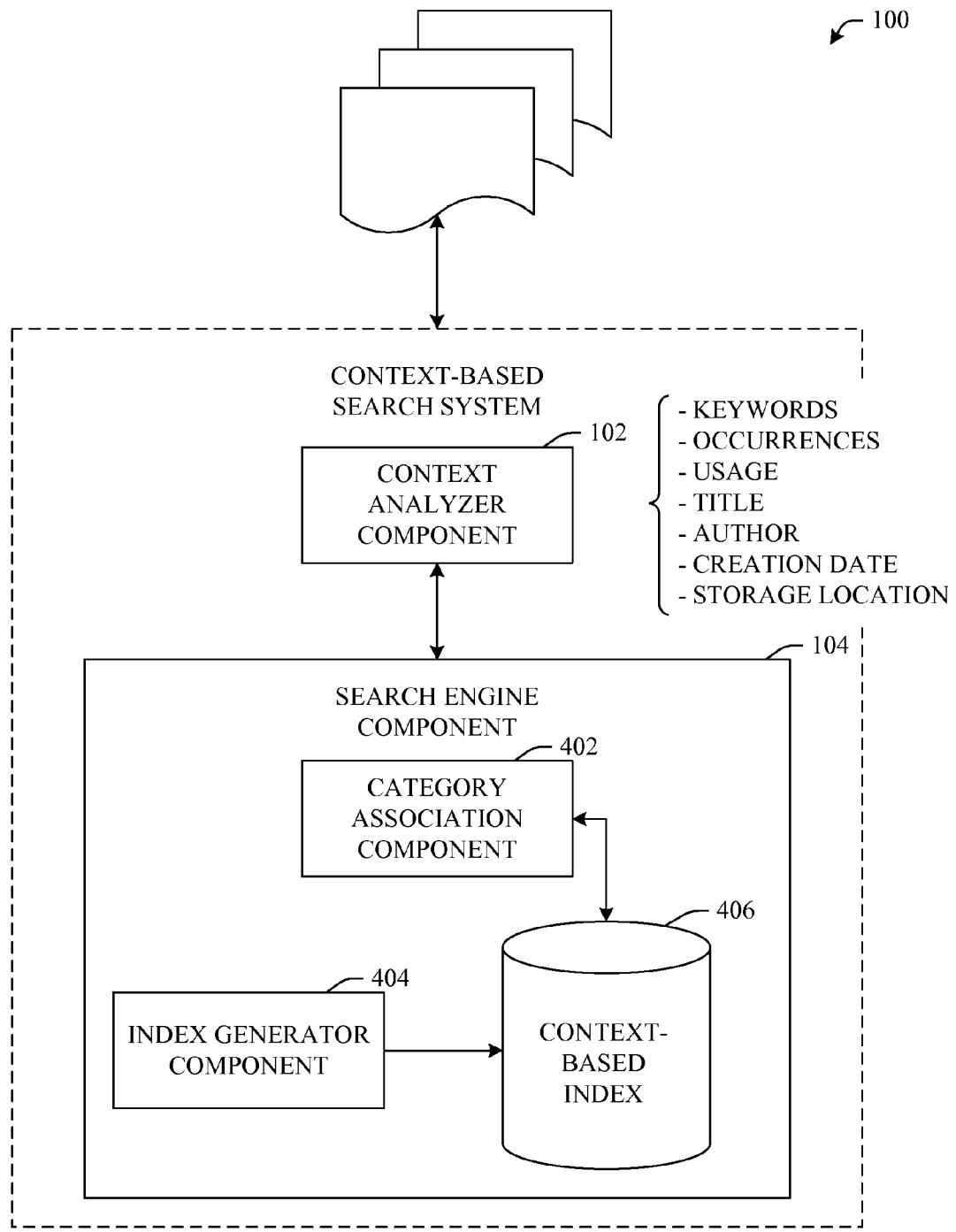
FIG. 4 illustrates an example system that employs an index generator that establishes a context-based index in accordance with an aspect of the innovation.

FIG. 4 illustrates an alternative block diagram of a context-based search system in accordance with an aspect of the innovation. As shown in FIG. 4, most any criteria can be considered by the context analyzer component 102 in establishing context. It is to be understood that the items highlighted in FIG. 4 are provided merely to add perspective to the innovation and are not intended to limit the innovation in any way. Rather, the factors noted are but a small subset of factors that can be considered in determining context of a document or reference.

As shown, keywords within a reference can be employed to establish context. For instance, additional factors related to the keywords, such as occurrence rate, usage, etc. can be employed to determine and/or infer context of a document. It will be appreciated that algorithmic and other logic mechanisms can be employed to establish context of a document based upon keywords and factors surrounding the keywords within a document.

Other factors such as, title, author, creation date, storage location, etc. can be employed to further establish context. For example, a document that references George Bush as President of the United States can potentially be about George Herbert Walker Bush or George W. Bush. However, further analysis of a document might reveal that the presidency at issue is from 1989 to 1993, thus, the context of the document can be determined or inferred to reference George Herbert Walker Bush. While this is a simplistic example of analysis that can be performed, it is to be understood that most any analysis can be performed to determine and/or infer context based upon factors within a document or reference.

With continued reference to FIG. 4, the search engine component 104 can include a category association component 402 that classifies documents based upon context determined by the context analyzer component 102. Continuing with the above example, categories related to George H. W. Bush could be, '41$^{st}$ President of the United States,' '43$^{rd}$ Vice President of the United States,' '11$^{th}$ Director of Central Intelligence,' 'Yale University,' etc. Accordingly, the category association component 402 can be employed to associate or 'bucketize' documents into categories based upon context in view of a search query.

In other aspects, an index generator component 404 can be employed to establish a context-based index 406 of documents. Here, the context-based index 406 can be used to enhance efficiency of search by maintaining an index or cross-reference that identifies documents and their relative association to contextual categories. Thus, upon searching, the category association component 402 can streamline the process of identifying context by accessing the context-based index 406. As described above, in other aspects, metadata can be embedded within the document or reference (e.g., header) such that the category association component 402 can easily associate a reference to a contextual category.

Figure 5:
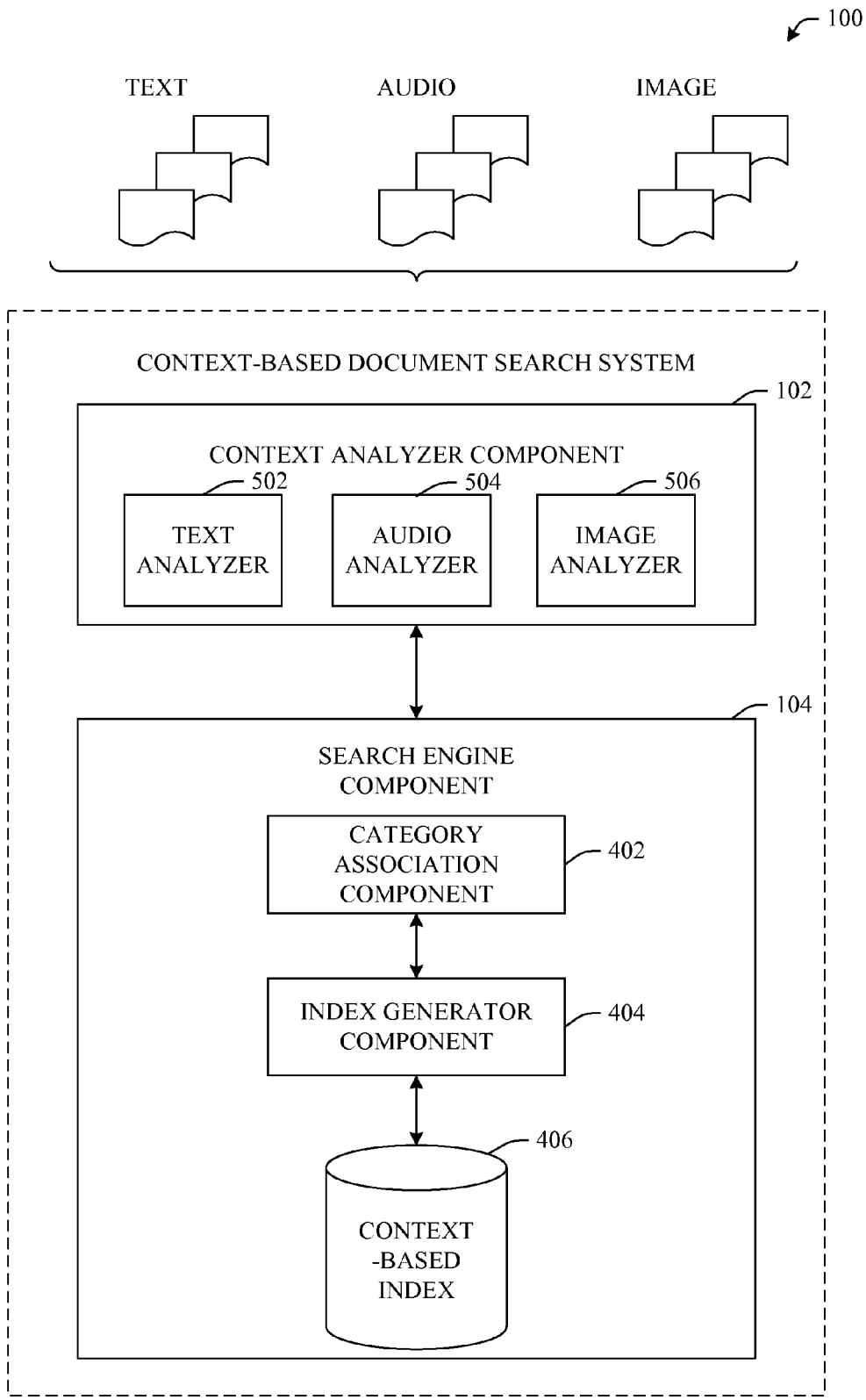
FIG. 5 illustrates an example context analyzer component that employs a text, audio and image analyzer to establish document context in accordance with aspects of the innovation.

Referring now to FIG. 5, an alternative block diagram of system 100 is shown. In particular, as shown, the context analyzer component 102 can include a text analyzer 502, an audio analyzer 504 and/or an image analyzer 506. While specific analyzer components (502, 504, 506) are illustrated in FIG. 5, it is to be understood that most any analysis can be performed in accordance with alternative aspects without departing from the spirit and/or scope of the innovation. For example, the audio analyzer 504 can analyze most any sounds or speech to establish a context for the document or reference. Similarly, the image analyzer 506 can evaluate still images or video images in order to establish a context related to a document. Further, it will be understood that a reference can often include multiple types of data (e.g., text, audio, image . . . ). Accordingly, the sub-components (502, 504, 506) of the context analyzer component 102 can be employed in combination to establish the context using most any appropriate mechanism.

Figure 6:
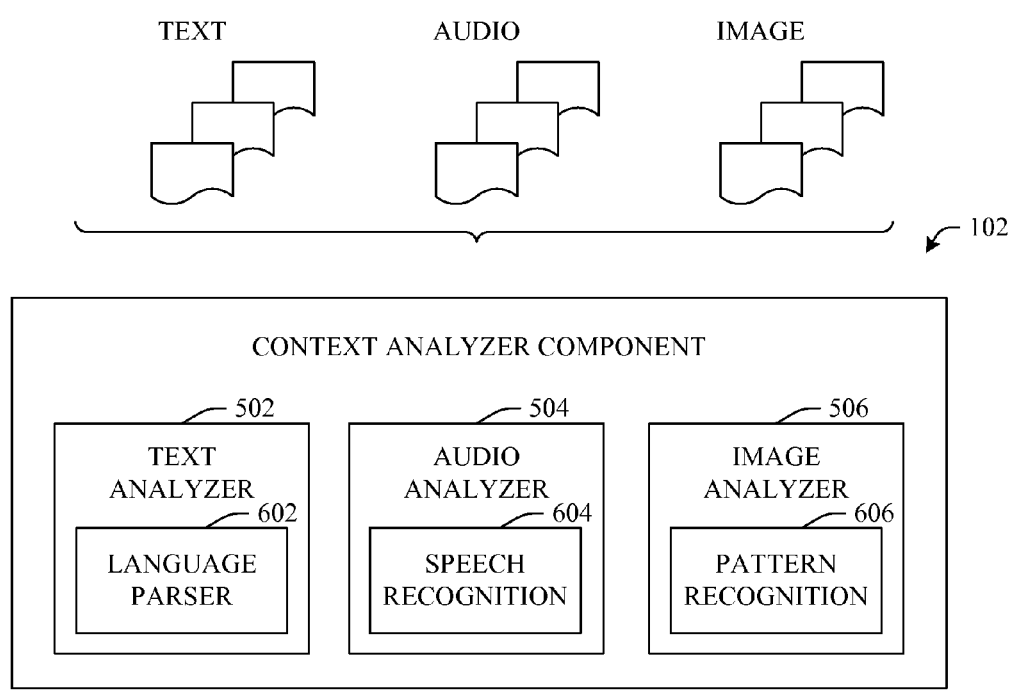
FIG. 6 illustrates an example context analyzer component that employs a language parser, a speech recognition component and a pattern recognition component to establish document context in accordance with aspects of the innovation.

Referring now to FIG. 6, illustrated is an example context analyzer component 102. Specifically, FIG. 6 illustrates that the text analyzer component 502 can include a language parser component 602, the audio analyzer component 504 can include a speech recognition (or speech to text converter) component 604 and the image analyzer component 506 can include a pattern recognition component 606. As described above, each of these sub-components (602, 604, 606) can be employed to establish context of a document.

By way of example, the image analyzer component 506, together with the pattern recognition component 606 can be employed to interpret images included within a document. For example, facial recognition can be employed to identify people within an image. Similarly, pattern recognition can be used to identify buildings, places, objects, etc. within an image. These interpretations can be used by the context analyzer component 102 to determine or infer context associated with a document.

Figure 7:
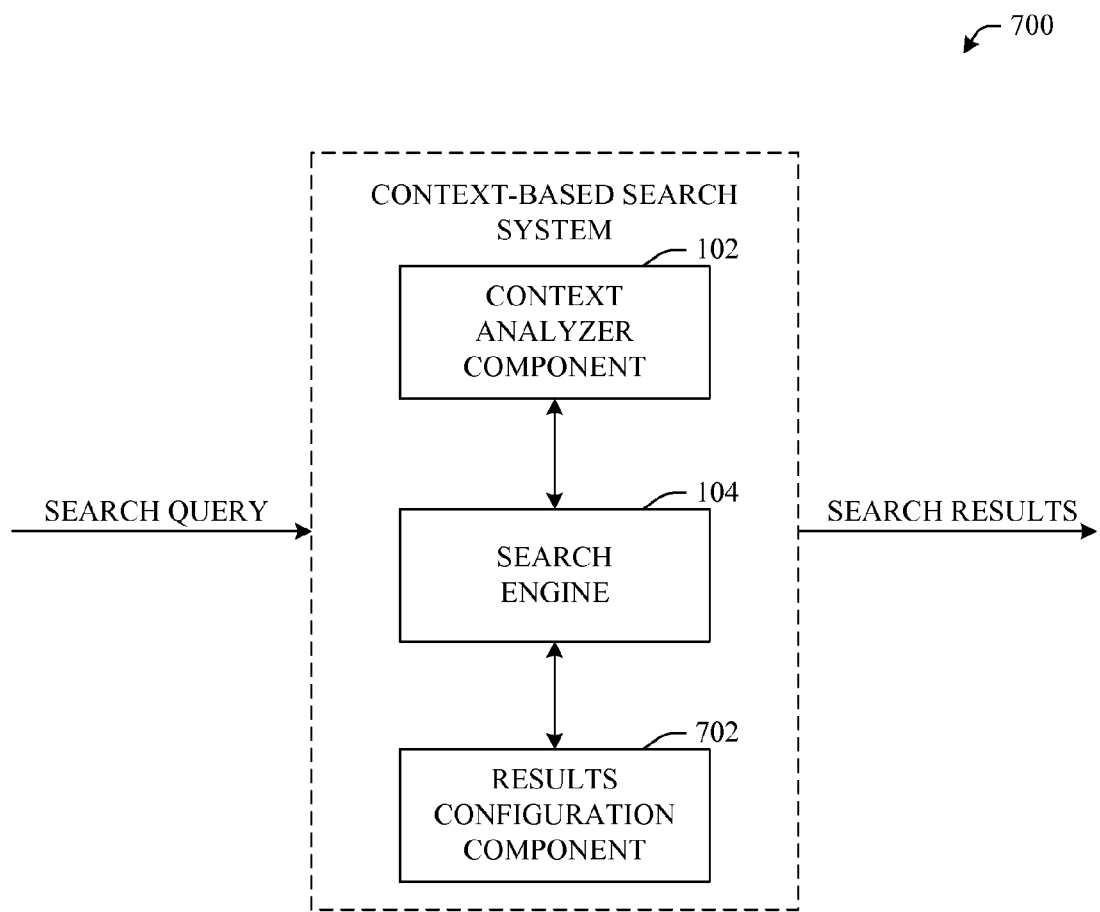
FIG. 7 illustrates an example context-based search system that employs a results configuration component that categorizes search results in accordance with aspects of the innovation.

FIG. 7 illustrates an example block diagram of a system 700 that facilitates context-based computer search in accordance with an aspect of the innovation. In addition to the components (e.g., 102, 104) and functionalities described supra, the system 700 can include a results configuration component 702 that can filter, rank, order, etc. results of a computer-based search.

Figure 8:
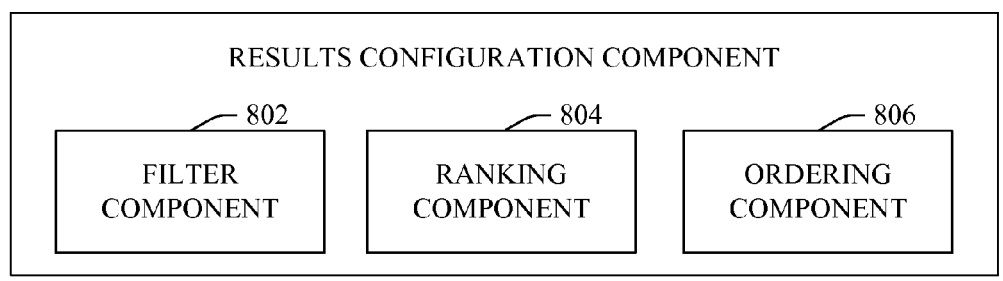
FIG. 8 illustrates an example results configuration component that filters, ranks or orders results in accordance with aspects of the innovation.

FIG. 8 illustrates an example results configuration component 702 in accordance with an aspect of the innovation. Generally, the results configuration component 702 can include a filter component 802, a ranking component 804 and an ordering component 806. As will be understood, each of these sub-components can filter, rank and/or order based upon a most any predefined or inferred threshold (e.g., relevance), policy or preference. For instance, the results configuration component 702 can automatically rank results within categories based upon relevance to a particular search query.

While conventional search engines operate merely based upon 'content' (e.g., keywords, hit-rate of keywords), in aspects, the subject innovation employs 'context' rather than merely content to identify search results and to classify the same. For example, in accordance with the innovation, when a document or reference is crawled, an index of the content can be established in addition to a profile (or context) of the document. In other words, the innovation can build a profile (or context) of a document by looking at all the terms that are indexed for that document and ranking based upon on a taxonomy. Here, the taxonomy is a view, based on users' interests, of what the content types are for documents.

In accordance with the innovation, it is possible to know something (e.g., context) about the documents. In other words, beyond just what terms or keywords index into the document, the innovation can employ a different basis for ranking the relevance of hits, context. The innovation can rank based on how rich a site is at supplying content of a given type. Thus, for example the innovation could support searches for most any categories, e.g., 'news,' 'sports,' 'music & entertainment,' 'places: local attractions by city,' 'things to buy.'

These categories can be predefined, inferred or based upon some defined metric such as, the most popular and monetizable categories (e.g., ones with the richest and most numerous advertisers). It will be appreciated that popular categories can be established or determined by mining the searches done by users. For example, upon mining all of the indexed terms for a site, one could rank the site by number of instances or 'density' of instances on that site of 'New York.'

In aspects, where the document is website, it can also be possible to recognize the navigation path to a site from the arbitrary text of a site. Accordingly, this can provide an easy and automated way of having a sense that the site is actually about, e.g., New York. Even though the system can index many other terms on that site, the site can be in the taxonomy of places associated with New York, in this example.

In yet other aspects, the innovation can employ machine learning and reasoning (MLR) mechanisms which facilitate automating one or more features in accordance with the subject innovation. The subject innovation (e.g., in connection with context determination and categorization) can employ various MLR-based schemes for carrying out various aspects thereof. For example, a process for determining context of a document can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria the context of a document, how best to categorize results, when/if to select a document based upon a query, how to configure/render the results, etc.

Figure 9:
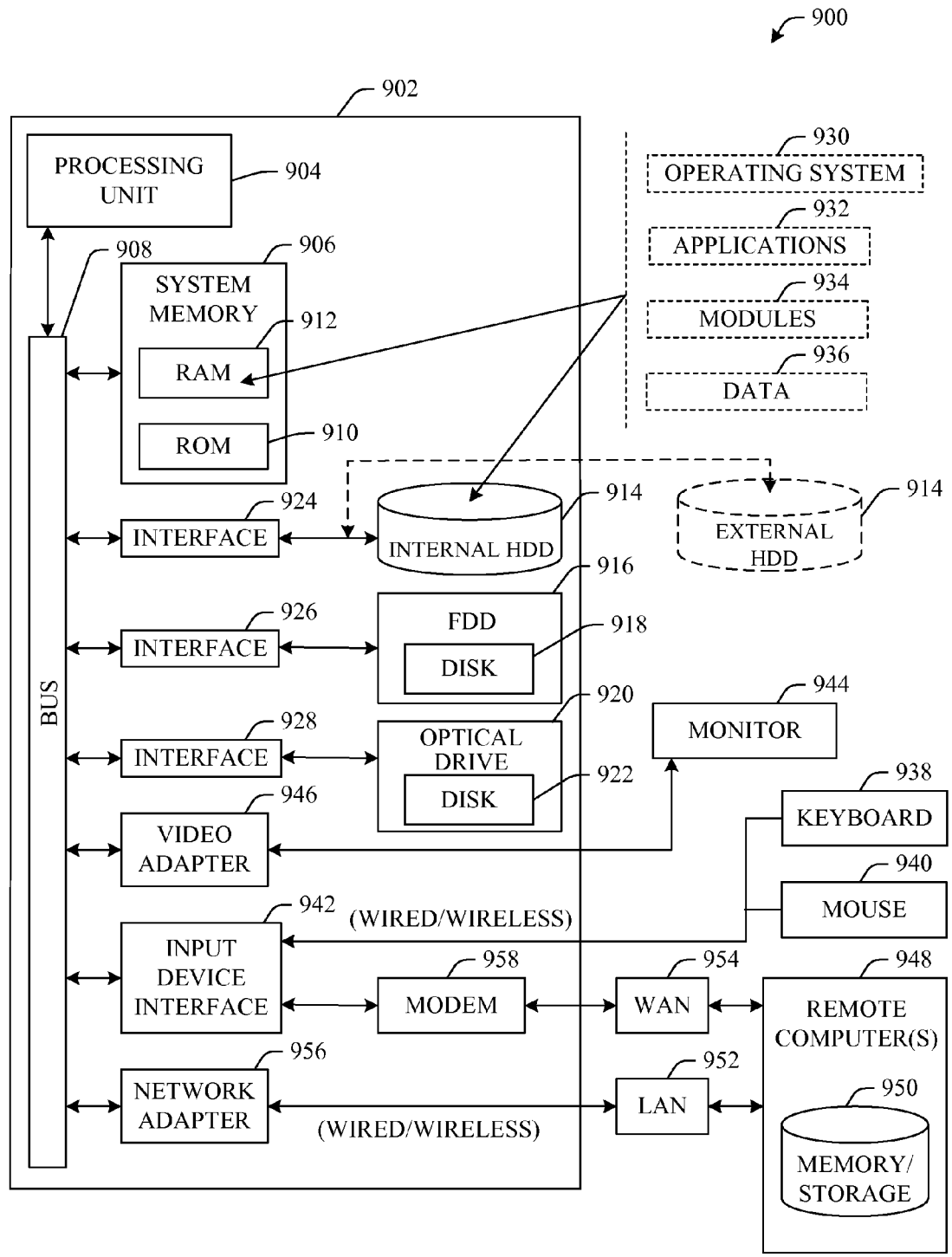
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
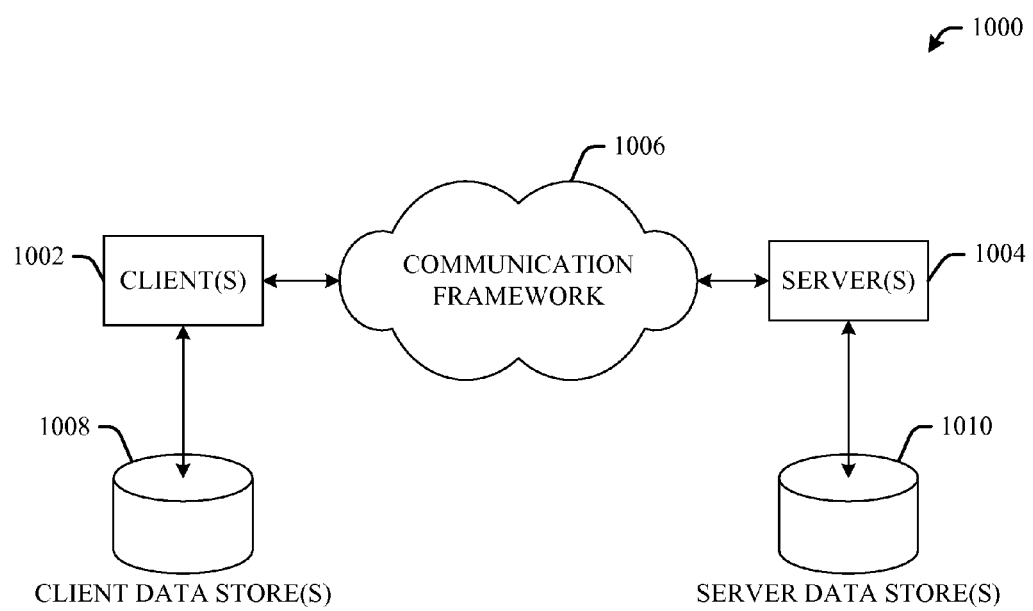
FIG. 10 illustrates a schematic block diagram of an example computing environment in accordance with the subject innovation.

Referring now to FIG. 10, there is illustrated a schematic block diagram of an exemplary computing environment 1000 in accordance with the subject innovation. The system 1000 includes one or more client(s) 1002. The client(s) 1002 can be hardware and/or software (e.g., threads, processes, computing devices). The client(s) 1002 can house cookie(s) and/or associated contextual information by employing the innovation, for example.

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   a computer readable storage medium having computer readable instructions stored thereon that are operable by one or more system components, the one or more system components comprising:
   a context analyzer component that establishes context of each of a plurality of documents, wherein the context analyzer component includes an image analyzer that employs facial recognition to establish the context;
   a search engine component that identifies a plurality of search results based upon the context of each of the plurality of documents in view of a search query; and
   a category association component that maps each context to a category and ranks each context within the category, the category being determined by mining a plurality of search queries submitted.

2. The system of claim 1, wherein the context analyzer component employs word patterns within a document to establish the context.

3. The system of claim 1, wherein the context analyzer component employs locality of terms within a document to establish the context.

4. The system of claim 1, wherein the context analyzer employs at least one of a keyword, occurrence rate of a keyword, usage of a keyword, title, author, creation date, or storage location to establish the context.

5. The system of claim 1, wherein the search engine component renders the plurality of search results as a function of a plurality of categories.

6. The system of claim 1, further comprising an index generator component that generates a context-based index of the plurality of documents, wherein the context analyzer component employs the context-based index to establish the context of each of the plurality of documents.

7. The system of claim 1, wherein the context analyzer component includes a text analyzer that employs a language parser to establish the context.

8. The system of claim 1, wherein the context analyzer component includes an audio analyzer that employs speech recognition to establish the context.

9. The system of claim 1, further comprising a results configuration component that renders the plurality of search results as a function of context-based categories.

10. The system of claim 9, further comprising at least one of a filter component, a ranking component or an ordering component that organizes the categorized search results for rendering.

11. The system of claim 1, further comprising a machine learning and reasoning component that employs at least one of a probabilistic and a statistical-based analysis that infers an action that a user desires to be automatically performed.

12. A computer-implemented method comprising:
    establishing, by a processor configured with instructions to implement context-based searching, a context of each of a plurality of documents and storing the established context in an index;
    updating the index when documents are created or updated;
    receiving a search query specifying one or more query terms;
    employing the index to identify a subset of the plurality of documents associated with the search query;
    adding context to the search query using reference terms that enhance the search query, the reference terms being located within a defined locale of the one or more query terms found in the subset of the plurality of documents;
    employing the index to identify one or more resultant documents based upon the enhanced search query; and
    rendering the one or more resultant documents.

13. The computer-implemented method of claim 12, wherein the rendering includes categorizing the one or more resultant documents.

14. The computer-implemented method of claim 12, wherein the establishing the context comprises:
    parsing text within each of the plurality of documents; and
    analyzing the parsed text to establish the context.

15. The computer-implemented method of claim 12, wherein the establishing the context comprises:
    converting speech to text within each of the plurality of documents; and
    analyzing the text to establish the context.

16. The computer-implemented method of claim 12, wherein the establishing the context comprises:
    employing pattern recognition to classify images within each of the plurality of documents; and
    analyzing the images to establish the context.

17. The computer-implemented method of claim 12, wherein the reference terms used to add context to the search query are not one of the one or more query terms.

18. A computer-executable system comprising:
    a processing device;
    means for receiving a document;
    means for analyzing the received document to determine if the document includes text data, audible data, or image data;
    means for establishing a context of the received document using keywords from the text data, text extracted from the audible data using speech recognition, or key features established from recognizing objects in the image data;
    means for establishing a reference in a context-based index for the received document;
    means for receiving a search query specifying one or more terms;
    means for employing the context-based index to identify contextually-relevant documents in view of the received search query;

means for adding context to the received search query using reference terms found in the contextually-relevant documents which are in a locale of the one or more terms specified in the received search query;

means for updating the contextually-relevant documents based on the added context; and means for associating the contextually-relevant documents with a plurality of categories, the plurality of categories being determined by mining a plurality of search queries submitted.

19. The computer-executable system of claim 18, further comprising means for rendering the contextually-relevant documents based upon context-based categories.

20. The computer-executable system of claim 18, wherein the reference terms used to add context to the received search query are not one of the one or more terms specified in the received search query.

* * * * *